United States Patent
Anderson

(10) Patent No.: US 10,621,787 B2
(45) Date of Patent: Apr. 14, 2020

(54) METHOD AND APPARATUS FOR OVERLAYING A PICTURE OF A REAL SCENE WITH A VIRTUAL IMAGE, AND MOBILE DEVICE

(71) Applicant: 3DQR GmbH, Magdeburg (DE)

(72) Inventor: Daniel Anderson, Magdeburg (DE)

(73) Assignee: 3DQR GMBH, Magdeburg (DE)

( * ) Notice: Subject to any disclaimer, the term of this patent is extended or adjusted under 35 U.S.C. 154(b) by 0 days.

(21) Appl. No.: 15/918,796

(22) Filed: Mar. 12, 2018

(65) Prior Publication Data
US 2019/0371064 A1    Dec. 5, 2019

Related U.S. Application Data

(63) Continuation of application No. PCT/EP2016/071328, filed on Sep. 9, 2016.

(30) Foreign Application Priority Data

Sep. 11, 2015    (DE) .................. 10 2015 115 394

(51) Int. Cl.
*G06T 19/00* (2011.01)
(52) U.S. Cl.
CPC .................. *G06T 19/006* (2013.01)
(58) Field of Classification Search
CPC .......... G06T 19/006; G06T 2207/30204; G06T 2219/004
See application file for complete search history.

(56) References Cited

U.S. PATENT DOCUMENTS

2012/0113228 A1* 5/2012 Konno ................. H04N 13/239
348/47
2013/0010103 A1* 1/2013 Ihara ........................ G08G 1/04
348/116

(Continued)

FOREIGN PATENT DOCUMENTS

KR    1020120082187 A    7/2012

OTHER PUBLICATIONS

Kan et al. "QR code based augmented reality applications". Handbook of Augmented Reality. Springer New York, 2011. Chapter 16. pp. 339-354.

(Continued)

*Primary Examiner* — Haixia Du
(74) *Attorney, Agent, or Firm* — Dorsey & Whitney LLP

(57) ABSTRACT

A method of overlaying a picture of a real scene with a virtual image comprises a step of reading image data, wherein the image data represent a picture of the real scene captured by an environment sensor of a mobile device, a step of determining marker data from the image data, wherein the marker data represent a picture and a positioning of a marker arranged in the real scene, a step of reading virtual image data, wherein the virtual image data represent image data selected from a plurality of virtual image data using the marker data, wherein the virtual image data comprise a representation instruction for representing the virtual image and a positioning instruction for positioning the virtual image, a step of determining object data from the image data, wherein the object data represent a picture and a positioning of object portion of an object arranged in the environment of the marker in the real scene and a step of ascertaining a positioning rule for representing the virtual image with reference to the picture of the object portion using the object data and the virtual image data.

14 Claims, 4 Drawing Sheets

(56) References Cited

U.S. PATENT DOCUMENTS

| | | | | |
|---|---|---|---|---|
| 2014/0210858 | A1* | 7/2014 | Kim | G06F 3/147 |
| | | | | 345/633 |
| 2015/0279105 | A1 | 10/2015 | Hanai et al. | |
| 2016/0093109 | A1* | 3/2016 | Tawara | G06T 19/006 |
| | | | | 345/633 |
| 2019/0266803 | A1 | 8/2019 | Anderson et al. | |

OTHER PUBLICATIONS

Teng et al. "Developing QR code based augmented reality using SIFT features". Ubiquitous Intelligence & Computing and 9th International Conference on UIC and ATC, IEEE, 2012. pp. 985-990.

Kan et al. "Applying QR code in augmented reality applications". Proceedings of the 8th International Conference on Virtual Reality Continuum and its Applications in Industry. ACM, 2009. pp. 253-257.

Tsouknidas et al. "QR-code calibration for mobile augmented reality applications" A International AR Standards Meeting, Feb. 17, 2011, 1 page.

Yoon et al. "QR code data representation for mobile augmented reality". The International AR Standards Meeting. 2011. pp. 17-19.

Park et al. "Barcode-Assisted Planar Object Tracking Method for Mobile Augmented Reality". International Symposium on Ubiquitous Virtual Reality, Jul. 2011, pp. 40-43.

International Search Report and Written Opinion dated Jan. 1, 2018 in connection with International Patent Application No. PCT/EP2017/078464, 22 pages including English translation.

Bunma, et al. "Using Augmented Reality to Increase Capacity in QR Code." 2014 IEEE, pp. 440-443.

Kurkovsky, et al. "Current Issues in Handheld Augmented Reality." The 2nd International Conference on Communications and Information Technology: Information Technology and Cloud Computing, Hammamet. pp. 68-72, 2012.

Ruminski. "Modeling Spatial Sound in Contextual Augmented Reality Environments." 6 pages, 2015.

Sodnik, et al. "Spatial Sound Localization in an Augmented Reality Environment." Nov. 2006, pp. 111-118.

Zhou, et al. "An experimental study on the role of 3D sound in augmented reality environment." Interacting with Computers, 16, 2004, pp. 1043-1068.

* cited by examiner

METHOD AND APPARATUS FOR OVERLAYING A PICTURE OF A REAL SCENE WITH A VIRTUAL IMAGE, AND MOBILE DEVICE

RELATED APPLICATIONS

This application claims priority benefit of and is a Continuation Application of co-pending International Patent Application PCT/EP2016/071328, which was filed on Sep. 9, 2016. International Patent Application PCT/EP2016/071328 claimed priority benefit of German Patent Application No. 102015115394.7, which was filed Sep. 11, 2015. The entire contents of the above identified prior filed applications are hereby incorporated herein by reference.

FIELD OF THE INVENTION

The invention relates to a method of and an apparatus for overlaying a picture of a real scene with a virtual image, wherein the method may for example be executed using a mobile device, and to a mobile device, such as a smartphone.

BACKGROUND

The basic concept of Augmented Reality (AR) has been existing for several decades and designates the overlay of real-time pictures of reality (e.g. as a camera picture) with virtual information.

SUMMARY

It is the object of the invention to provide an improved method and an improved apparatus for overlaying a picture of a real scene with a virtual image, and an improved mobile device.

This object is achieved by a method of and an apparatus for overlaying a picture of a real scene with a virtual image, and by a mobile device according to the main claims. Advantageous variants and embodiments of the invention become obvious from the subsequent dependent claims.

The approach described specifically concerns the field of Augmented Reality overlaying in an optically congruent manner, wherein virtual objects are linked with anchor points in the real scene in terms of position and orientation and are always superimposed in the three-dimensional scene in correct perspective as if they were part of the real environment. According to one embodiment, every single picture of a camera stream may be analyzed using image processing methods, and the correspondingly necessary three-dimensional position and orientation of the virtual object may be calculated, in order to achieve this effect.

Selection of the virtual object to be overlaid, also referred to as virtual image in the following, may advantageously be performed using a marker, for example a QR code, present in the real scene. Positioning of the virtual image within a picture of the real scene may advantageously be performed using at least one object portion, for example an edge or a face, of an object arranged in the surrounding of the marker in the real scene. A picture of the object portion may thus be used as an anchor point for the virtual object. By using the marker, it may be ensured with little effort that the virtual image suitable for the real scene is selected. By using the object portion, it may be ensured that the virtual image can be positioned very accurately even in adverse conditions, for example bad light conditions. This positioning is possible even if the marker is no longer or only partially depicted in later pictures of the real scene.

A method of overlaying a picture of a real scene with a virtual image comprises the following steps: reading image data, wherein the image data represent a picture of the real scene captured by an environment sensor of a mobile device; determining marker data from the image data, wherein the marker data represent a picture and a positioning of a marker arranged in the real scene; reading virtual image data, wherein the virtual image data represent image data selected from a plurality of virtual image data using the marker data, wherein the virtual image data comprise a representation instruction for representing the virtual image and a positioning instruction for positioning the virtual image; determining object data from the image data, wherein the object data represent a picture and a positioning of object portion of an object arranged in the environment of the marker in the real scene; ascertaining a positioning rule for representing the virtual image with reference to the picture of the object portion using the object data, the marker data and the virtual image data.

The real scene may, for example, be a region of an environment of the mobile device lying within the sensing range of the environment sensor. The environment sensor may be an optical image sensor, for example a camera. The picture may represent an image of the real scene captured using the environment sensor, wherein the image may be displayed using a display of the mobile device. The virtual image may represent any illustration, for example graphics, a symbol or writing, which can be inserted into the picture of the real scene. The virtual image may represent a three-dimensional or also a two-dimensional image or a dot. An overlay of the picture of the real scene with the virtual image may include the picture of the real scene, in which at least a portion is masked completely or for example in a semi-transparent manner by the virtual image. Marker may be a marker artificially placed in the scene, for example a geometrical marker, in the form of a code of pictogram. The marker may be realized as an artificial marker in the form of a one-dimensional or two-dimensional code. For example, the marker may be realized as a matrix with light and dark areas. The marker may represent optoelectronically readable writing. Data in the form of a symbol may be imaged in the marker. The marker data may comprise information on the picture of the marker and the positioning of the picture of the marker with picture of the real scene. In the further steps of the method, the marker data may be used completely or partially and, if necessary, also in a further processed form. The positioning instruction for positioning the virtual image the suitable for positioning the virtual image with respect to the picture of the marker in the picture of the real scene. The object portion may be a part, portion or region, for example an edge or face, of a real object. An object may be any item, for example a building, a fitment, a vehicle or a piece of paper. The object portion may, for example, be an outer edge or an edge between faces angled with respect to each other of such an item. The object data may comprise information on the picture of the object portion and a positioning of the picture within the picture of the real scene. In the further steps of the method, object data may be used completely or partially and, if necessary, also in a further processed form. The positioning rule may be suitable for positioning the virtual image with respect to the picture of the object portion the picture of the real scene or a further picture of the real scene. The positioning rule may be ascertained using the positioning of the picture of the marker, the positioning of the picture of the object portion and the positioning instruction.

According to an embodiment, the method of overlaying a picture of a real scene with a virtual image comprises the following steps: reading image data, wherein the image data represent a picture of the real scene captured by an environment sensor of a mobile device; determining marker data from the image data, wherein the marker data represent a picture and a positioning of a marker arranged in the real scene; reading virtual image data, wherein the virtual image data represent image data selected from a plurality of virtual image data using the marker data, wherein the virtual image data comprise a representation instruction for representing the virtual image and a positioning instruction for positioning the virtual image; determining object data from the image data, wherein the object data represent a picture and a positioning of object portion of an object arranged in the environment of the marker in the real scene; ascertaining a positioning rule for representing the virtual image with reference to the picture of the object portion using the object data and the virtual image data.

In general, the image data may represent real image data, the object data may represent real object data, and the object portion may represent a real object portion.

According to an embodiment, in the step of ascertaining, the positioning rule may be ascertained using the marker data or at least part of the marker data.

According to an embodiment, continuous iteration of the steps of reading, determining and ascertaining may be performed in short time intervals, in particular several times per second. For example, the steps may be executed between 10 times and 200 times per second (i.e. every tenth of a second or every $5/1000$ second).

The approach described enables the positioning of the virtual object in an illustration with correct perspective from a great distance and relatively unlimited position of the mobile device. Advantageously it is not necessary for the mobile device to recognize the marker and to position the associated virtual object in a fixed position with respect to this marker. A great distance may be a distance between ten times and five thousand times the side length of the marker, for example the QR code. According to an embodiment, the range between ten times and five hundred times the side length of the marker is preferred. With a side length of 2 cm of the marker, this corresponds to a distance of up to 100 m (5000× side length). The relatively unlimited position may mean deviations between 0.1° to 180° in all three axes. Thus, 360° all around shall be covered. It is also not necessary for the marker to be in the field of view (environment sensor) of the mobile device at all times.

According to an embodiment, the approach described utilizes the measuring devices arranged in the mobile device—in addition to the image capture—for measuring the change in the relative position—after the detection of the marker—with respect to the position fixed when first detecting the marker. In addition, data of a real object from the real image data are used as object portion, also referred to as a "secondary marker", so that the actual marker no longer needs to be in the sensing range of the environment sensor.

The devices mentioned in the following may be used—after the one-time detection of the marker—as corresponding measuring devices, also referred to as recognition devices or measuring sensors, in the mobile device, for example in the smartphone or tablet, in order to determine a deviation from the first position. Individual measuring sensors also any combinations selected here.

Acceleration sensor: for measuring translatory motion of the mobile device one hand, for determining the direction of Earth's gravity relative to the device and thus orientation/rotation of the device on the other hand.

Rotational sensor: for measuring rotational motion of the mobile device.

Magnetometer: for measuring Earth's magnetic field and thus horizontal rotation of the mobile device.

GPS receiver: optional with very great distances and for positioning at accuracy of±2 meters.

The use of acceleration sensor and rotational sensor as an addition to the image sensor is preferred here.

The image sensor may be limited to visible light (400-800 nm), but may also additionally or exclusively sends other spectral ranges (e.g. additionally or also exclusively IR or UV light).

For example, measured values of a corresponding measuring device may be used to determine a shift of the object portion or of the picture of the object portion caused by motion of the mobile device. According to an embodiment, a value representing the shift is used to ascertain the positioning rule for positioning the virtual image with respect to the picture of the object portion in the step of ascertaining.

Hence, the positioning rule may, for example, be ascertained using a measured value of a measuring device or several measuring devices, for example an acceleration sensor, a rotational sensor, a magnetometer or a GPS receiver, of the mobile device.

This further solves a technical problem occurring when the virtual object is to move in reality. If the marker disappears from the field of view of the environment sensor when tracking this motion, the virtual illustration does not crash. Thus, image sequences in a wide environment region may now be represented.

According to an embodiment, the method comprises a step of providing at least part of the marker data to an interface to an external device. In this case, in the step of reading virtual image data, the virtual image data may be read via the interface to the external device, for example a server. The interface mentioned may, for example, be a radio interface. Advantageously, the selection of the virtual image data may be performed using the external device. Thereby, memory space on the mobile device may be saved, and it may be ensured that up-to-date virtual image data are available at all times.

The method may comprise a step of selecting the virtual image data from the plurality of virtual image data using the marker data. The step of selecting may be performed using an external device or a device of the mobile device. The latter option offers the advantage that the method may be executed autarkically on the mobile device. The virtual image data may be selected by comparing the picture of the marker or an identification of the marker with pictures or identifications of potential markers associated with the plurality of virtual images, for example, and selecting that one of the virtual images for which there is a match. In this way, the matching virtual image may be selected with great reliability.

To this end, the method may comprise a step of ascertaining an identification of the marker using the marker data. In the step of selecting, the virtual image data may then be selected using the identification. An identification may for example be a code or a character string.

For example, the marker may represent a machine-readable code comprising a corresponding identification of the marker. In this case, the identification of the marker may be determined as part of the marker data in the step of determining marker data. By using a machine-readable code, the picture of the marker may be evaluated very easily.

The method may comprise a step of using the positioning rule to overlay another picture of the real scene with the virtual image. Advantageously, the positioning rule, once determined, may be used to overlay temporally successive pictures of the real scene with the virtual image.

To this end, the step of using may, for example, comprise a step of reading further image data, wherein the further image data represent the further picture of the real scene captured by the environment sensor of the mobile device, a step of determining a positioning of the further picture of the object portion from the further image data, and a step of creating overlaid image data using the further image data, the further picture of the object portion and the positioning rule, wherein the overlaid image data represent an overlay of the further picture of the real scene with the virtual image. In the step of determining the positioning, the positioning of the further picture of the object portion within the further picture of the real scene may be determined. Thus, pictures of the object portion in temporally successive pictures of the real scene may be employed as anchor points for the virtual image. In the step of creating overlaid image data, the virtual image may be represented using the representation instruction.

The method may comprise a step of displaying an overlay of the further picture of the real scene with the virtual image using a display of the mobile device. To this end, for example, the overlaid image data already mentioned may be provided to the display. The display may be a screen or a display device.

The method may comprise a step of capturing the image data using the environment sensor of the mobile device. For example, image data may be captured temporally continuously so that pictures of the real scene may be provided temporally continuously. The virtual image may be superimposed in the individual pictures of the real scene.

According to various embodiments, also multiple virtual images may be used for the overlay. In this case, in the step of reading, multiple virtual image data may be read, or the virtual image data may comprise representation instructions and positioning instructions for representing and positioning the plurality of virtual images.

Also, multiple object portions of one or different objects may be used. In this case, in the step of determining the object data, multiple object data may be determined, or the object data may represent pictures and positionings of the plurality of object portions. Correspondingly, in the step of ascertaining the positioning rule, multiple positioning rules for positioning the virtual image with respect to individual object portions may be ascertained. As an alternative, a positioning rule suitable for positioning the virtual image with respect to the pictures of the plurality of object portions may be ascertained. The use of a plurality of object portions offers the advantage that the virtual image can be positioned very accurately and can be positioned even when not all object portions used are depicted in a picture of the real scene.

The approach presented here further provides an apparatus configured to perform, control or implement the steps of a variant of a method presented here in corresponding devices. The object underlying the invention may be achieved quickly and efficiently also by way of this embodiment of the invention in the form of an apparatus.

The apparatus may be configured to read input signals and to determine and provide output signals using the input signals. For example, an input signal may represent a sensor signal readable via an input interface of the apparatus. An output signal may represent a control signal or a data signal which can be provided at an output interface of the apparatus. The apparatus may be configured to determine the output signals using a processing rule implemented in hardware or in software. For example, the apparatus may comprise a logic circuit, an integrated circuit or a software module and may, for example, be realized as a discrete component or be included in a discrete component.

What is also advantageous is a computer program product having program code which may be stored on a machine-readable carrier, such as semiconductor memory, hard disk or optical memory, and is used for performing the method one of the previously described embodiments, when the program product is executed on a computer or an apparatus.

BRIEF DESCRIPTION OF THE DRAWINGS

Embodiments of the invention are illustrated in the drawings and explained in greater detail in the subsequent description. In the figures.

DETAILED DESCRIPTION

Figure 1:
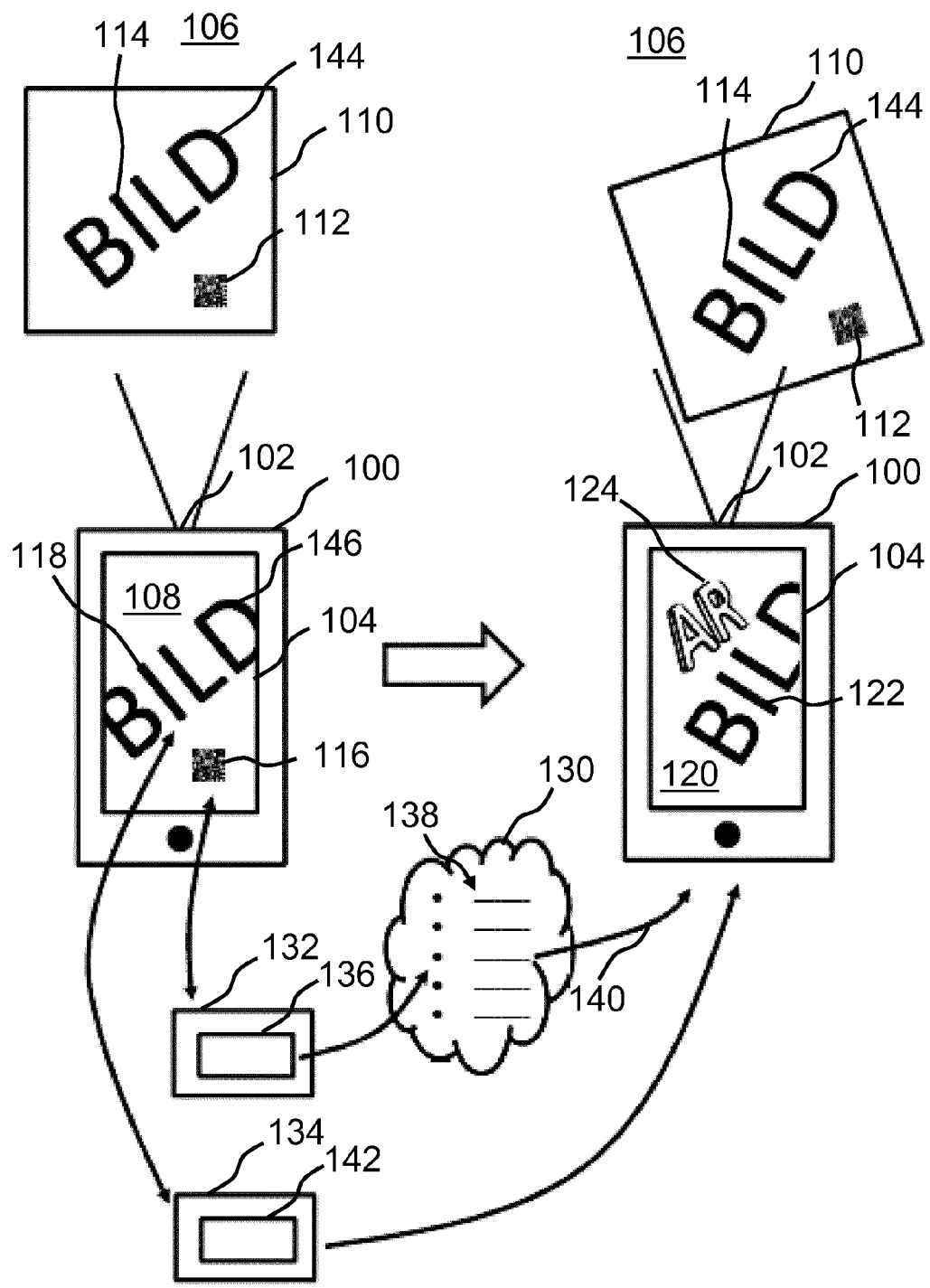
FIG. 1 shows an overview illustration of a method of overlaying a picture of a real scene with a virtual image, according to an embodiment.

The left half of FIG. 1 shows a mobile device 100, for example a smartphone, comprising an environment sensor 102 and a display 104. According to this embodiment, the environment sensor 102 is a camera configured to capture a real scene 106, also referred to as real environment, in a sensing range of the environment sensor 102. According to this embodiment, the display 104 is a display device configured to display a picture 108 of the real scene 106 captured by the environment sensor 102 to an operator.

According to this embodiment, an object 110 on the outer surface of which there is a marker 112 is arranged in the real scene 106. For example, the object 110 may be any image or an item. The object 110 and the marker 112 are arranged partially and completely in the sensing range of the environment sensor 102, respectively. In particular, at least one object portion 114 of the object 110 is arranged in the sensing range of the environment sensor 102. Thus, the picture 108 comprises a picture 116 of the marker 112 and at least one picture 118 of the object portion 114.

The right half of FIG. 1 shows the mobile device 100 at a temporally subsequent point of time as compared to the illustration in the left half. Due to interim motion of the mobile device 100, the real scene 106 has changed slightly as viewed from the environment sensor 102, so that a further picture 120 slightly changed with respect to the picture 116 is displayed by the display 104. For example, the further picture 120 may depict the real scene 106 in another perspective as compared to the picture 108 or another section of the real scene 106. For example, the other section is such that the further picture 120 comprises a further picture 122 of the object portion 114, but no further picture of the marker 112. Nevertheless, the further picture 120 may be overlaid with a virtual image 124 by using the described method.

According to an embodiment, the further picture 120 is to be overlaid with the virtual image 124 in a predetermined position and/or predetermined orientation. According to an embodiment, such a predetermined overlay is possible as long as the further picture 120 comprises a suitable further picture 122 of the object portion 106 which can be used as an anchor point for the virtual image 124.

The steps of the method may be executed exclusively using devices of the mobile device 100 or additionally using at least one external device, exemplarily illustrated here as cloud. For example, the external device 130 may be coupled online to the mobile device 100.

The method may be executed continuously or may be launched with a content call or a view of the real scene 106 using the display 104 requested by the operator.

The picture 108 is based image data provided by the environment sensor 102 or an evaluation device downstream of the environment sensor 102. Marker data 132 and object data 134 are determined from the image data, schematically illustrated here, for example using an object recognition method or another suitable image processing method. The marker data 132 are determined from the image data by way of a suitable extraction and comprise identification data 136 associated with the marker 112, for example an identification ID associated with the marker 112 and/or an at rest or a pointer associated with the marker 112, for example in the form of a URL. The marker data 132 or parts of the marker data 132 or data determined therefrom, such as the identification associated with the marker, may be used to select virtual image data 140 associated with the marker 112 from the plurality of virtual image data using an association rule 138, for example an allocation table, which is stored in a memory of the external device 130, according to this embodiment. The plurality of virtual image data may be stored in the allocation table 138 in the form of AR content. The virtual image data 140 are transmitted to the mobile device 100 and used for displaying the virtual image 124. According to an embodiment, selecting the virtual image data 140 is executed only when a new marker 112 is found, for example when the picture 116 of the marker 112 or the identification data 136 of the marker 112 was first extracted from the image data representing the picture 108.

The object data 134 are determined from the image data by way of a suitable extraction of suitable image features. The suitable image features are used for creating a positioning rule 142, also referred to as a new AR marker, for example for temporary and local use. The positioning rule 142 is used by the mobile device 100 so as to be able to represent the virtual image 124 as an overlay of the picture 106 or of the further picture 120 even when no picture 116 of the marker 112 is available. No online matching is necessary for using the positioning rule 142. According to this embodiment, the positioning rule 142 refers to the object portion 114, which represents a natural marker.

According to an embodiment, reliable association of the AR content on the basis of a URL and stable 3-D tracking on the basis of a new, and hence up-to-date, natural marker are enabled.

According to an embodiment, at least two natural markers, i.e. for example the object portion 114 and another object portion 144 of the object 110, are used so as to be able to position the virtual image 124 in the further picture 120. In this case, the positioning rule 142 relates to both object portions 114, 144 or their pictures 118, 122, 146. In the embodiment shown in FIG. 1, the further object portion 144 is not depicted in the further picture 120 of the real scene 106. Nevertheless, the virtual image 124 can be positioned by way of the further picture 122 of the object portion 114.

According to an embodiment, the approach described is based on a combination of two methods by which three-dimensional positions of objects can be extracted from camera images.

In the first one of these methods, predefined geometrical shapes are used as marker 112, which are placed in the region of the camera picture, e.g. QR codes. Based on the known shape of such a marker 112 and its picture 116 in the camera picture 108, its three-dimensional orientation in space can be determined by way of image processing. Advantages of the first method are that, due to predefined design rules of the marker 112, it can unambiguously be identified in the camera picture 108, and that also additional information may thus be encoded directly in the appearance of the marker 112, such as the ID of a marker 112 or a web link via QR code. In this way, by means of an encoding scheme defined once, e.g. black and white bits of the QR code, a very great number of different markers can unambiguously be distinguished from each other optically. However, it is a disadvantage that these markers 112 hardly are robust against small disturbances in the camera picture 108 due to the necessarily exactly defined shape. Such small disturbances may be e.g. a slight focus blur, motion blur or a steep viewing angle. This leads to the fact that the three-dimensional location of one of these markers 112 can only be extracted correctly if it is completely focused, parallel to the image plane and can be seen unhidden in the camera picture 108, and the camera 102 is almost stationary relative to the marker 112. Hence, e.g. the continuous AR superposition of a virtual 3-D object 124 in correct position on the basis of a marker 112 in the form of a QR code becomes almost impossible. In case of a large design of a geometrical marker 112, this problem is somewhat moderated, but accompanied by another disadvantage in that such marker then is to be placed in the scene 106 in a prominent and large manner, which is unsuitable for most applications.

In the second one of these methods, which may also be referred to as Natural Feature Tracking or NFT, pictures of objects 110, e.g. the cover image of a flyer, in the real environment 106 previously are defined as markers, and natural optical features 114 thereof, e.g. distinctive points, edge courses or colors, first are extracted from the original in a suitable form by an algorithm, i.e. quasi learned. The camera picture 108 then is searched for these previously learned natural features 114 for AR position determination, i.e. for determining the position of a virtual image 124 to be overlaid, and by means of optimization methods it is decided if the object 110 sought currently is in the camera picture 108 and also its orientation and position is estimated on the basis of the arrangement of its individual features 114. The advantage here is that there is great robustness to disturbances due to the optimization-based method. Thus, positions of marker objects 114 can be recognized even in blurred camera pictures 108, 120, when partially hidden and at very steep angles. Further methods (e.g. SLAM) even allow for continuously expanding, on the basis of an initial recognition of a marker object 114 in the camera picture 108, 120, its model with features from the current environment so that its orientation in space may partly be determined correctly even if it cannot be seen in the camera picture 120 anymore itself. However, this method has significant disadvantages, in particular when a great number of different markers is to be recognized therewith. At first three marker object 114 is to satisfy certain optical criteria with respect to the natural optical appearance so as to be recognizable in the camera picture 108, 120 at all. Moreover, for unambiguous identification, all recognizable markers 114 must clearly differ from each other—the greater the number of recognizable markers 114, the higher the likelihood of misallocation. This is particularly problematic if many optically similar objects 100, e.g. business cards, within a database are to be distinguished. Furthermore, a database with the natural features of all recognizable markers must already exist at the time of recognition, and this complete database must be compared with the camera picture 108, 120 to find out if one of the markers 114 is in the camera picture. In the case of a system such as a smart phone AR app with a continuously growing marker database, this requires providing the current version of the database at a central location (online), with each smartphone 100 having to send a computationally extensive picture search request to this database for analyzing every single camera picture 108, 120.

According to an embodiment, the approach described here is based on a combination of the two methods above, wherein both methods are performed in successive, linked stages for recognition and 3-D positioning of marker objects in the camera picture 108, 120: In the first stage, a geometrical, predefined marker design, e.g. QR code or a barcode, is used as marker 116 in the camera image 108 purely for identifying virtual image data 140 of a virtual image 124, referred to as AR content 124 here. Once one of these markers 116 has been found in the camera picture 108, at first the identification 142 is extracted therefrom, i.e. for example the ID or URL of the AR content 124 and its initial position and orientation in the real scene 106. At the same time, for example exactly in the moment of recognition of the marker 112, for example in the form of a code, the current environment directly around the marker 112 is captured in the camera picture 108, natural features 114 are extracted therefrom, and a new natural marker 118 is created therewith in real-time in accordance with the second method. In all subsequent camera pictures 120 and movements of camera 102 marker 114, the three-dimensional position determination of the AR content 124 may now be effected on the basis of a new, robust natural marker 114. In contrast to the original first method (cf. QR code recognition), continuously stable representation and movement of three-dimensional virtual objects as virtual images 124 is possible, or they can be tracked even if they are only placed in the real scene 106 in a small and unobtrusive manner, in contrast to geometrical markers. Furthermore, in contrast to the original second method (recognition of natural markers), the optical distinctiveness of the newly created marker 114 is completely irrelevant as compared with other markers, because it's association with AR content 124 was already fixed by the linked code, i.e. the marker 112. By way of directly extracting a URL from the linked code, it can also be avoided to continuously search and online feature database, and the number of distinguishable markers within an application is increased to almost infinity. Furthermore, by way of creating the natural AR marker 114 immediately at the time of use, in contrast to previous AR methods, even objects 100 frequently changing their optical appearance, e.g. fronts of houses at different times of day or times of year, can be used as natural markers 114.

Figure 2:
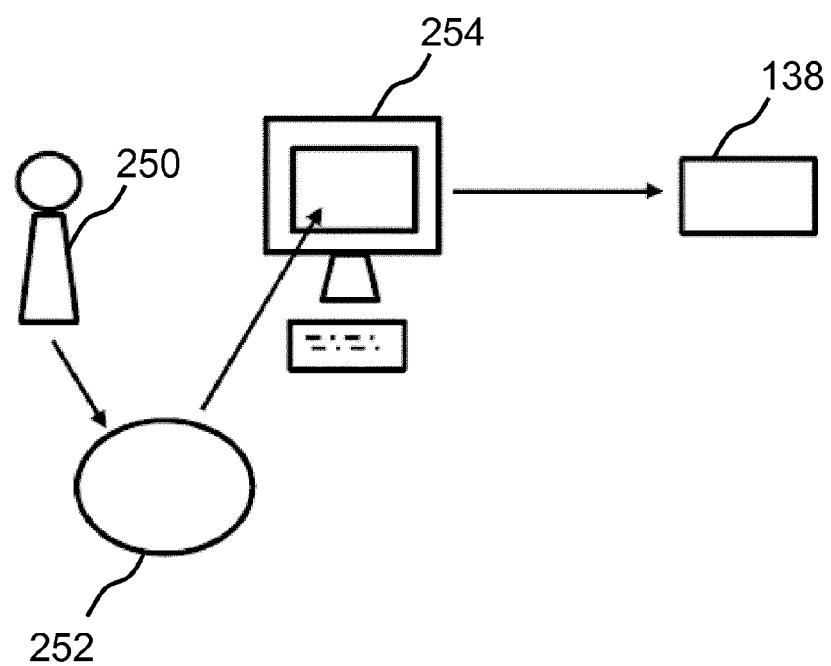
FIG. 2 shows an overview illustration of a method of creating an association rule, according to an embodiment.

FIG. 2 shows an overview illustration of a method of creating association rule 138, according to an embodiment. The association rule 138 may be stored in the external device shown in FIG. 1, for example.

An operator 250 provides 3D AR contents 252, for example in the form of a plurality of virtual image data. A web interface 254 is used to create or update the association rule 138 based on the 3D AR contents 252. According to an embodiment, the association rule 138 comprises a link to a specific, unique URL for each 3D AR content 252 of the 3D AR contents 252.

Figure 3:
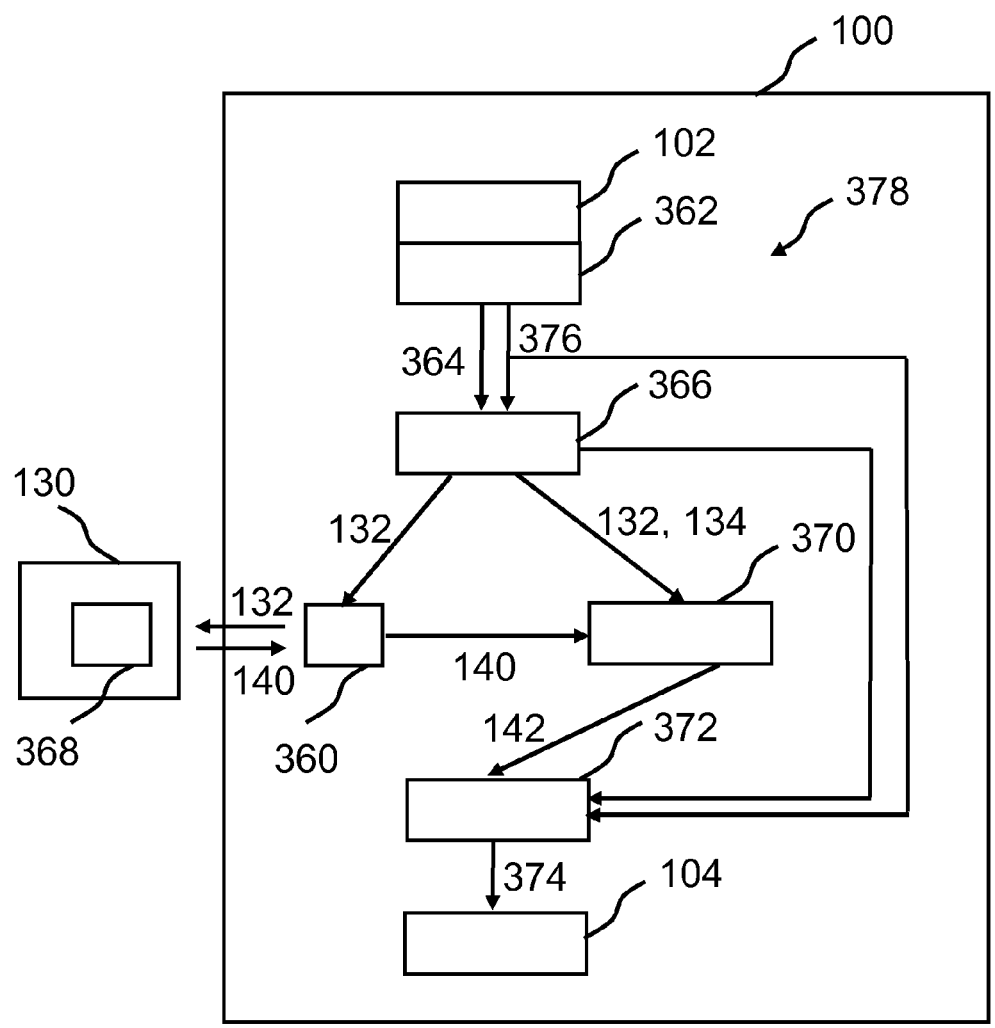
FIG. 3 shows a schematic illustration of a mobile device, according to an embodiment.

FIG. 3 shows a schematic illustration of a mobile device 100, according to an embodiment. The mobile device 100 may be the mobile device shown in FIG. 1, for example. The mobile device 100 comprises an environment sensor 102 and a display 104 for displaying a picture of a real scene captured by the environment sensor 102. The picture may be overlaid with a virtual image. According to this embodiment, the mobile device 100 comprises an interface 360, for example interface for wireless data transmission, to an external device 130. According to an embodiment, the environment sensor 102 and the display 104 are arranged on a back side and a front side of the mobile device 100, respectively.

The mobile device 100 comprises a reader 362 coupled to the environment sensor 102 and configured to read image data 364 of the environment sensor 102 as raw data or already preprocessed data. For example, the reader 362 is an interface to the environment sensor 102. The image data 364 represent a picture of the real scene captured by the environment sensor 102. The image data 364 read by the reader 362 are processed further in a determiner 366 of the mobile device 100. In particular, marker data 132 and object data 134 are determined, for example extracted, from the image data 364. The marker data 132 represent a picture and a positioning of a marker arranged in the real scene, for example of the geometrical marker 112 shown in FIG. 1. The object data 134 represent a picture and a positioning of object portion of an object arranged in the surrounding of the marker in the real scene. For example, the object portion may be the object portion 114 shown in FIG. 1, which may be used as a natural marker. To this end, the determiner 366 is configured to first recognize the picture of the marker in the picture of the real scene and then determine the marker data associated with the picture of the marker from the image data 364. Correspondingly, the determiner 366 is configured to first recognize one or more suitable pictures of object portion is in the picture of the real scene and then determine the object data associated with the picture or pictures of the suitable object portion is from the image data 364.

According to this embodiment, the marker data 132 are provided to the external interface 360 and transmitted to the external device 130, for example in the form of an external appliance, via the external interface 360, for example a radio interface. The external device 130 comprises a selector 368 configured to select virtual image data 140 associated with the marker data 132 from a plurality of virtual image data using an association rule and provide the same to the external interface 360 of the mobile device 100. As an alternative, only parts of the image data 132 or the image data 132 in a further processed form may be provided to the reader 360 and/or the external device 130. The external interface 360 is configured to provide virtual image data 142 a determiner 370. The virtual image data 140 comprise a representation instruction for representing a virtual image and a positioning instruction for positioning the virtual image. The determiner 370 further is configured to receive the marker data 132 and the object data 134. The determiner 370 is configured to determine a positioning rule 142 for positioning the virtual image with respect to the picture of the object portion using the marker data 132, the object data 134 and the virtual image data 140.

According to this embodiment, the mobile device 100 comprises a controller 372 for controlling the display device 104. The controller 372 is configured to provide overlaid image data 376 to the display 104, for example in the form of a control signal for controlling a display shown by the display device 104. The overlaid image data 376 here represent an overlay of a further picture of the real scene with the virtual image. The controller 372 is configured to create the overlaid image data 376 using the positioning rule 142 provided by the determiner 370, further image data 376 and further object data 378. The further image data 376 represent a further picture of the real scene captured by the environment sensor 102. The further object data 378 comprise at least a positioning of the object portion within the further picture of the real scene.

According to an embodiment, the positioning rule 142 comprises the representation instruction for representing the virtual image comprised by the virtual image data 140. As an alternative, the representation instruction may be transmitted to the controller 372 separately from the positioning rule 142.

According to an embodiment, the selector 368 is part of the mobile device 100. In this case, the external device 130 is not required, and the external interface 360 may be realized as an internal interface.

The devices 360, 362, 366, 370, 372 shown in FIG. 3 are only in exemplary arrangement of devices of an apparatus for overlaying a picture of a real scene with a virtual image. For example, some or all of the devices 360, 362, 366, 370, 372 may be combined to form larger units for implementing the method steps of a method of overlaying a picture of a real scene with a virtual image.

Figure 4:
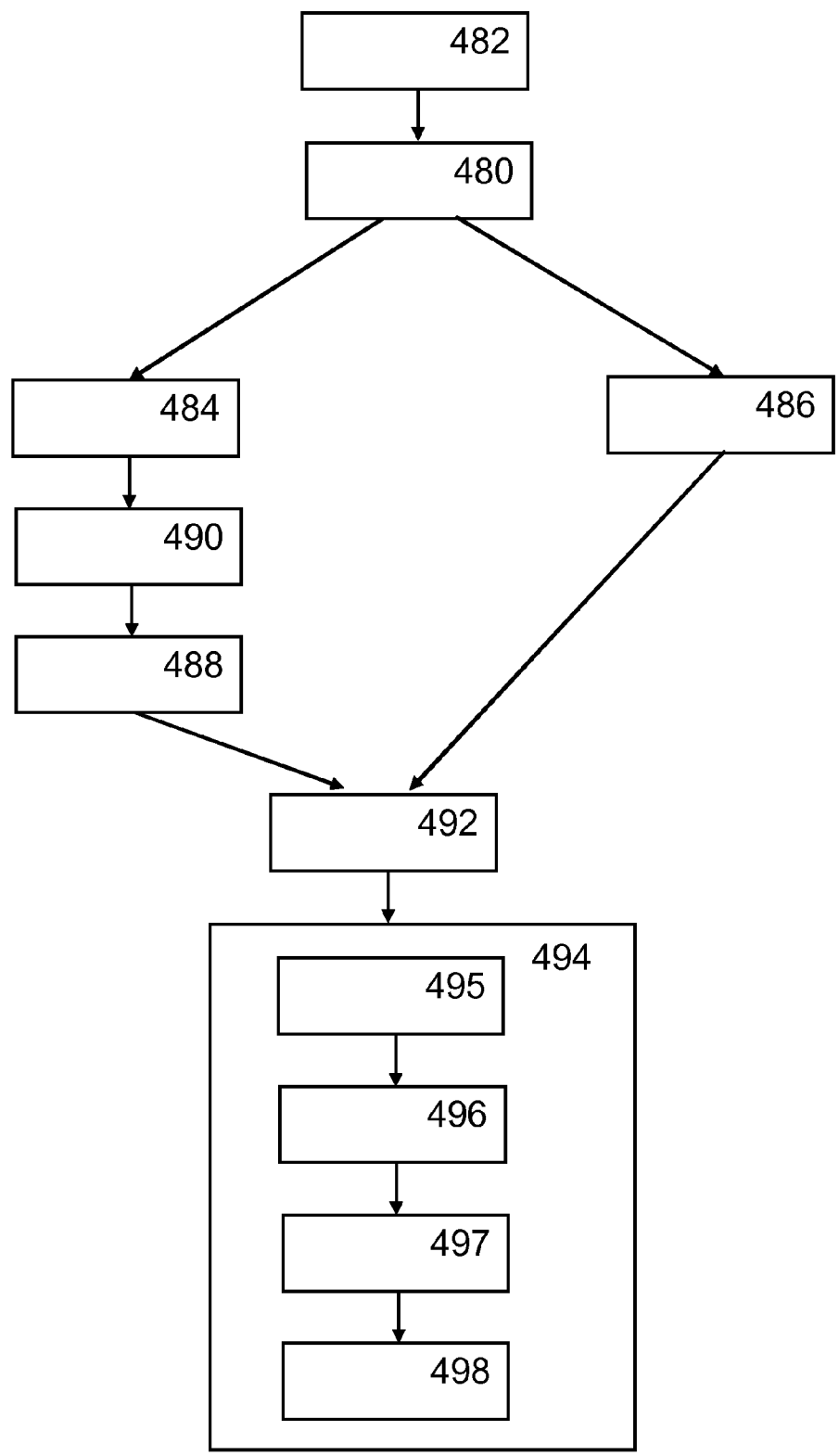
FIG. 4 shows a flowchart of a method of overlaying a picture of a real scene with a virtual image, according to an embodiment.

FIG. 4 shows a flowchart of a method of overlaying a picture of a real scene with a virtual image, according to an embodiment. The method may be executed using devices of a mobile device described on the basis of the preceding figures.

In a step 480, image data representing a picture of a real scene captured by an environment sensor of the mobile device are read. The image data may have been captured by the environment sensor in an optional preceding step 482. In a step 484, marker data representing a picture and a positioning of a marker arranged in the real scene are determined from the image data. Correspondingly, in a step 486, object data representing a picture and a positioning of an object portion of an object arranged in an environment of the marker in the real scene are determined from the image data. In a step 488, virtual image data representing image data selected from a plurality of virtual image data using the marker data and comprising a representation instruction for representing the virtual image and a positioning instruction for positioning the virtual image are read. In an optional step 490, which may be executed on the mobile device or an external device, the virtual image data are selected using the marker data. In a step 492, a positioning rule suitable for representing the virtual image with respect to the picture of the object portion is ascertained using the marker data, the object data the virtual image data, for example as an overlay of a further picture of the real scene.

In an optional step 494, the positioning rule is used to represent the overlay of the further picture of the real scene with the virtual image, for example on a display of the mobile device.

For example, the step 494 may comprise a step 496 of reading further image data representing the further picture of the real scene, a step 498 of determining a positioning of a further picture of the object portion further image data, and a step of creating 499 overlaid image data using the further image data, the further picture of the object portion and the positioning rule, wherein the overlaid image data represent an overlay of the further picture of the real scene with the virtual image. In the step of determining the positioning, the positioning of the further picture of the object portion within the further picture of the real scene can be determined. Thus, pictures of the object portion in temporally successive pictures of the real scene may be employed as anchor points for the virtual image. In the step of creating overlaid image data, the virtual image may be represented using the representation instruction.

The step 494 may be repeated continuously, wherein the positioning rule is used to continuously overlay further pictures of the real scene with the virtual image. The preceding steps need not be executed repeatedly, because it is sufficient to determine the positioning rule once.

According to an embodiment, in the step 486, object data representing pictures and positionings of several object portion is, for example two, three, four or more object portion is, of one or more objects associated in the environment of the marker in the real scene are determined from the image data. In this way, the number of anchor points for anchoring the virtual image in the further picture or the further pictures of the real scene may be increased. In this case, in the step 492, the positioning rule can be ascertained so that it is suitable for representing the virtual image in the further pictures of the real scene with respect to the pictures of the object portions. So as to implement this representation, the positionings of the individual pictures of the object portions are determined from the further image data in the step 498 of determining. Advantageously, in this case, the virtual image may still be positioned in accordance with the requirement deposited in the virtual image data even if not all pictures of the object portions are comprised by the further image data.

According to an embodiment, in the step 492, the positioning rule is ascertained using a measured value of a measuring device, in particular an acceleration sensor, a rotational sensor, a magnetometer or a GPS receiver of the mobile device.

The invention claimed is:

1. A method of overlaying a picture of a real scene with a virtual image, the method comprising steps of:
   reading image data, wherein the image data represent the picture of the real scene captured by an environment sensor of a mobile device;
   determining marker data from the image data, wherein the marker data represent the picture of the real scene and a positioning of a marker arranged in the real scene;
   reading virtual image data, wherein the virtual image data represent image data selected from a plurality of virtual image data using the marker data, wherein the selected virtual image data comprise a representation instruction for representing the virtual image and a positioning instruction for positioning the virtual image;
   determining object data from the image data, wherein the object data represent a picture and a positioning of an object portion of an object arranged in an environment of the marker in the real scene, wherein the picture of the object portion is used as an anchor point for the virtual image;
   ascertaining a positioning rule for representing the virtual image with reference to the picture of the object portion using the object data and the virtual image data;

reading further image data, wherein the further image data represent a further picture of the real scene captured by the environment sensor of the mobile device;

determining a positioning of a further picture of the object portion from the further image data; and creating overlaid image data using the further image data, the positioning of the further picture of the object portion and the positioning rule, wherein the further picture of the object portion is employed as the anchor point for the virtual image, and wherein the overlaid image data represent an overlay of the further picture of the real scene with the virtual image.

2. The method according to claim 1, wherein the image data represent real image data, the object data represent real object data, and the object portion represents a real object portion.

3. The method according to claim 1, wherein in the step of ascertaining the positioning rule is ascertained using the marker data or at least part of the marker data.

4. The method according to claim 1, wherein continuous iteration of the steps of reading image data, of determining marker data, of reading virtual image data, of determining object data and of ascertaining the positioning rule is performed three or more times per second.

5. The method according to claim 1, wherein in the step of ascertaining the positioning rule, the positioning rule is ascertained using a measured value of a measuring device of the mobile device.

6. The method according to claim 5, wherein the measuring device of the mobile device is selected from an acceleration sensor, a rotation sensor, a magnetometer or a GPS receiver.

7. The method according to claim 1, comprising a step of providing at least part of the marker data to an interface to an external device, wherein in the step of reading virtual image data the virtual image data are read via the interface to the external device.

8. The method according to claim 1, comprising a step of selecting the virtual image data from the plurality of virtual image data using the marker data.

9. The method according to claim 1, wherein the marker represents machine-readable code comprising an identification of the marker, wherein in the step of determining marker data the identification of the marker is determined as part of the marker data.

10. The method according to claim 1, comprising a step of displaying an overlay of the further picture of the real scene with the virtual image using a display device of the mobile device.

11. The method according to claim 1, comprising a step of capturing the image data using the environment sensor of the mobile device.

12. An apparatus for overlaying a picture of a real scene with a virtual image, wherein the apparatus comprises at least one device for implementing the steps of claim 1.

13. A mobile device configured for overlaying a picture of a real scene with a virtual image, the mobile device comprising:

an environment sensor configured for capturing image data; and a processor configured for:

reading the image data, wherein the image data represent the picture of the real scene captured by the environment sensor of the mobile device;

determining marker data from the image data, wherein the marker data represent the picture of the real scene and a positioning of a marker arranged in the real scene;

reading virtual image data, wherein the virtual image data represent image data selected from a plurality of virtual image data using the marker data, wherein the selected virtual image data comprise a representation instruction for representing the virtual image and a positioning instruction for positioning the virtual image;

determining object data from the image data, wherein the object data represent a picture and a positioning of an object portion of an object arranged in an environment of the marker in the real scene, wherein the picture of the object portion is used as an anchor point for the virtual image; and ascertaining a positioning rule for representing the virtual image with reference to the picture of the object portion using the object data and the virtual image data;

wherein the environment sensor is configured for capturing further image data and the processor is further configured for:

reading the further image data, wherein the further image data represent a further picture of the real scene captured by the environment sensor of the mobile device;

determining a positioning of a further picture of the object portion from the further image data; and creating overlaid image data using the further image data, the positioning of the further picture of the object portion and the positioning rule, wherein the further picture of the object portion is employed as the anchor point for the virtual image, and wherein the overlaid image data represent an overlay of the further picture of the real scene with the virtual image.

14. The mobile device of claim 13, wherein the mobile device comprises a smartphone.

* * * * *